United States Patent [19]
Latourrette et al.

[11] Patent Number: 4,661,334
[45] Date of Patent: Apr. 28, 1987

[54] PREPARATION OF ZEOLITES 4A AND/OR 13X

[75] Inventors: Bertrand Latourrette, Le Raincy; Anne Menesguen, Paris, both of France

[73] Assignee: Rhone-Poulenc Chimie de Base, Courbevoie, France

[21] Appl. No.: 653,084

[22] Filed: Sep. 21, 1984

[30] Foreign Application Priority Data

Sep. 21, 1983 [FR] France .................. 83 14985

[51] Int. Cl.$^4$ ............................ C01B 33/28
[52] U.S. Cl. ................... 423/329; 423/328; 502/60; 502/79
[58] Field of Search ............ 502/60, 79; 423/328, 423/329

[56] References Cited

U.S. PATENT DOCUMENTS

| | | | |
|---|---|---|---|
| 4,160,011 | 7/1979 | Estes et al. ............ | 423/328 |
| 4,248,847 | 2/1981 | Derleth et al. .......... | 423/329 |
| 4,275,048 | 6/1981 | Stein et al. ............ | 423/328 |
| 4,278,649 | 7/1981 | Christophloemk et al. .. | 423/328 |
| 4,519,933 | 5/1985 | Gresser et al. ......... | 252/140 |

FOREIGN PATENT DOCUMENTS

| | | |
|---|---|---|
| 57-03713 | 1/1982 | Japan . |
| 57-111226 | 7/1982 | Japan . |
| 57-129819 | 8/1982 | Japan . |
| 57-166311 | 10/1982 | Japan . |

Primary Examiner—John Doll
Assistant Examiner—Jackson Leeds
Attorney, Agent, or Firm—Burns, Doane, Swecker & Mathis

[57] ABSTRACT

Zeolites well suited for detergency, e.g., zeolites of type A, are adopted for mass production by simultaneously continuously introducing both an aqueous solution of sodium silicate and an aqueous solution of sodium aluminate into an unagitated first reaction zone to effect the continuous intimate admixture thereof, continuously transferring intimate admixture from said first reaction zone to a second zone of gelation to effect the continuous homogeneous gelling thereof, the time of retention of said intimate admixture in said first reaction zone being less than that period of time required for the gelation thereof, and thence effecting crystallization of a zeolite from said homogeneous gel.

14 Claims, 7 Drawing Figures

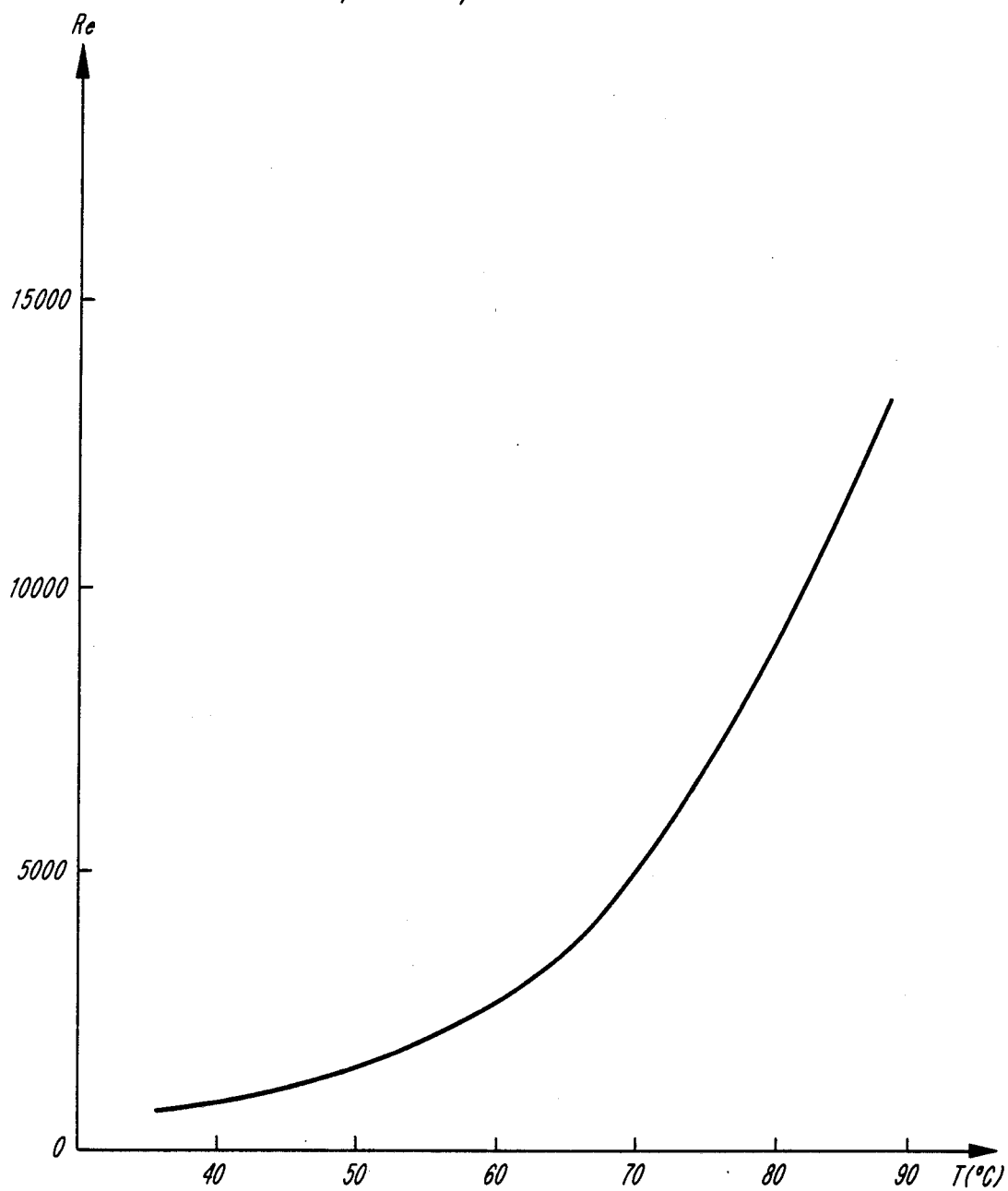

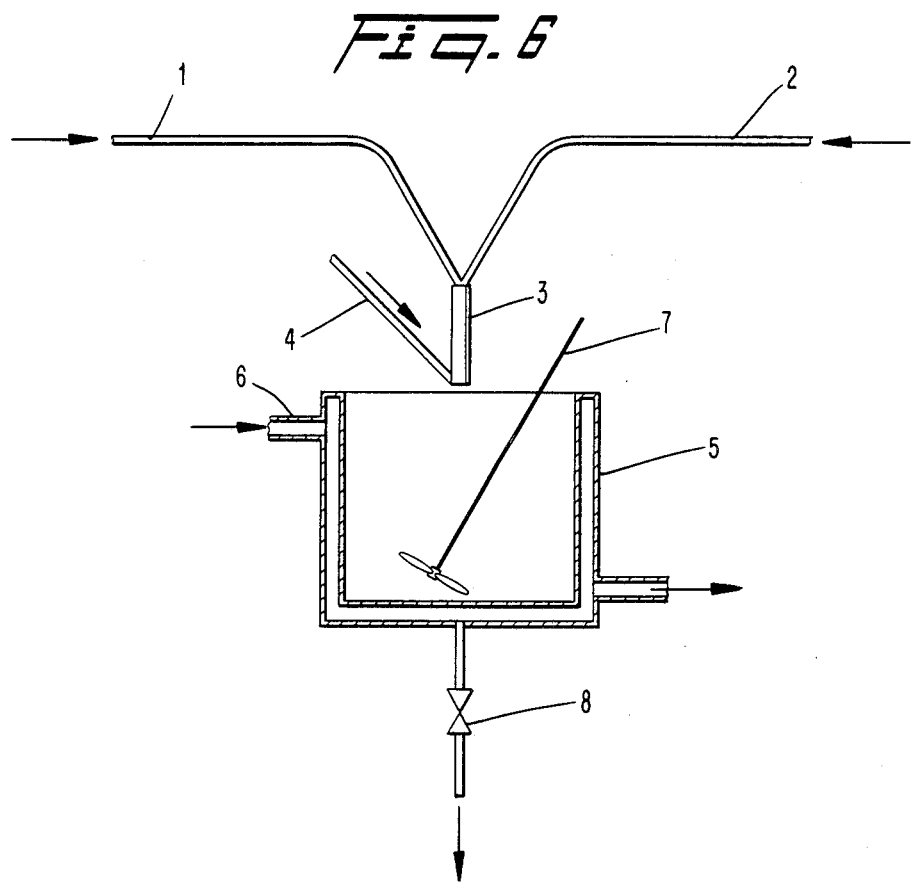
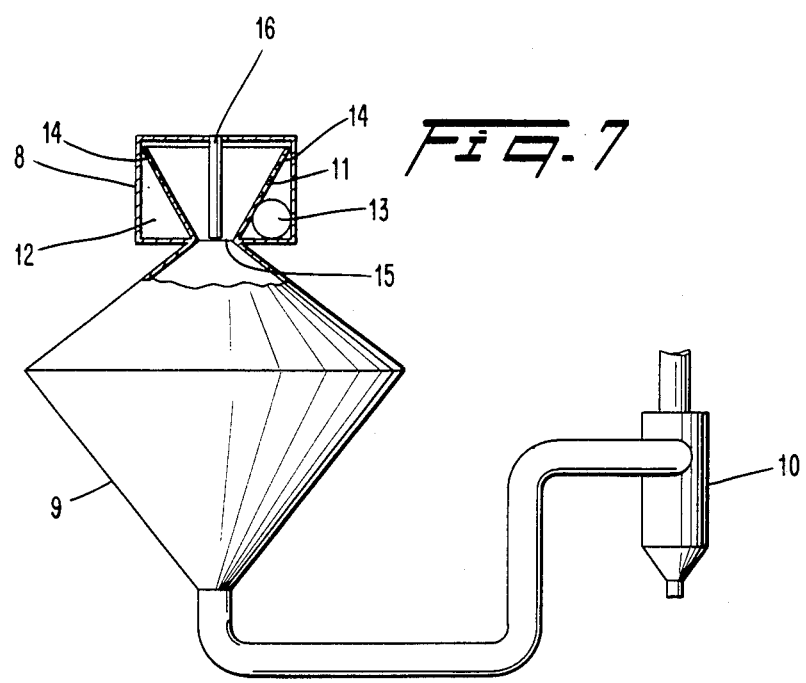

PREPARATION OF ZEOLITES 4A AND/OR 13X

BACKGROUND OF THE INVENTION

1. Field of the Invention

The present invention relates to an improved process for the preparation of zeolites, especially the zeolites of type A, having high cation exchange capacity, as well as the capacity for cation exchange at enhanced rate, and to the zeolites thus prepared and their use in detergent compositions/detergency.

2. Description of the Prior Art

For approximately the last decade this art has been replete with efforts to determine a proper substitute for sodium tripolyphosphate as a detergent builder to aid in detergency. Of necessity, such a substitute must:

(1) be an excellent cation exchanger or sequestrant, in particular of calcium and magnesium ions;
(2) be a good dispersant; and
(3) be capable of being mass produced in large quantities and at a low cost.

Obviously, it also must not be detrimental to the ecological environment.

Such efforts have in part focused on the zeolites as, on the one hand, they have already been otherwise used in detergent compositions and, on the other, in view of the advances to date attained in the field of synthetic zeolites.

Unfortunately, however, the available zeolites cannot compete with the sodium tripolyphosphates and, furthermore, while the requirements concerning the product are becoming more severe, the restrictions affecting processing are increasing.

Without being exhaustive, it can be said that certain major inroads have become discernible.

Even though the zeolites of type 4A, for example, may be produced at ambient temperature, industrial installations, for economic reasons, have typically adopted hot processes using at least one hot solution of at least one of the reagents. But problems involving the formation of gels and crystallization, and obviously the problem of the economy of energy arose, while at the same time the final products had to be cost competitive with the products they were designed to replace.

One of the most sensitive parameters is that of the formation of the gel and thus the quality of the contacting of the reagents, which is critical because it affects the quality of the final product.

For example, in European Pat. No. 13,417 it is proposed to use a double fluid nozzle system, wherein the reagents are separately introduced.

It has been proposed further, in European Pat. No. 17,013, to carry out multiple injection into a reactor, while maintaining a mean retention time of the reagents of less than 5 sec, but such multiple injection requires the use of a very long tube and entails a sinuous path.

In this case, intimate admixture apparently must be carried out after gelling.

It too is known that gels tend to obstruct their stream of flow, especially if same is winding and contains obstructions.

It has been further proposed in French Pat. No. 2,379,479, to perform a careful mixture in the shortest possible time, employing an inverted "Y" tube according to the examples, and wherein the time of mixing of the solutions varies from 6 to 7 min.

However, it would be redundant to emphasize the difficulties inherent in micro-mixing and macro-mixing systems in an industrial facility and the energy costs of such a solution.

Consideration too has been given to extending the time required for gelation.

Thus, in French Pat. No. 2,376,074 it is proposed to effect intimate admixture using relatively concentrated solutions (corresponding to an ultimate zeolite content in excess of 200 g/l) and at low temperature.

The results are said to be spectacular; however, the temperature of at least one of the reagents (for example, the aluminate) must be lowered, but it is produced at a relatively high temperature.

This of course makes any required heat transfer to the reaction medium much more difficult.

Cf. *Chemical Abstracts*, 97, No. 18, 147026z (1982), *Chemical Abstracts*, 97, No. 24, 200281g (1982) and Japanese Kokai No. 57-129,819 (1982), *Chemical Abstracts*, 96, No. 20, 164,989n (1982) and Japanese Kokai No. 57-03,713 (1982), and *Chemical Abstracts*, 98, No. 14, 109879t (1983) and Japanese Kokai No. 57-166,311 (1982).

SUMMARY OF THE INVENTION

Accordingly, a major object of the present invention is the provision of an improved process for zeolite production, entailing preparation of a homogeneous gel at high temperature, which gel is adopted for facile agitation and the overall process otherwise avoiding those disadvantages and drawbacks to date characterizing the state of this art.

Briefly, the present invention features a process for the preparation of various of the zeolites by continuously introducing a solution of sodium silicate and a solution of sodium aluminate into an unagitated or quiescent reactor in a manner such that the time required for the intimate admixture thereof is less than that required for gelation.

Such mixing time is hereby defined as that period of time required to provide a homogeneous mixture. The mixture is considered homogeneous when it displays at all points, at a given instant, the same composition, the same concentration and the same temperature.

Gelling or gelation hereby defined as that period of time required to obtain maximum viscosity within the reaction medium.

BRIEF DESCRIPTION OF THE DRAWINGS

FIG. 5 shows a variation of the minimum Reynold's number as funtion of temperature.

FIG. 6 is a schematic/diagrammatic depiction of an apparatus for carrying out the process according to the invention.

FIG. 7 is a schematic/diagrammatic depiction of a preferred apparatus for forming TTP's useful with the seolite of the present invention.

DETAILED DESCRIPTION OF THE INVENTION

More particularly according to the present invention, the reactor into which said reactants are continuously introduced is advantageously a tubular reactor, preferably of piston or plug-flow type. Nonetheless, in general, any reactor adopted to satisfy the aforesaid conditions may be used.

For example, a Venturi type mixer may also be used.

As aforesaid, the retention time required for the intimate admixture within the reactor should be less than, but nonetheless quite close to that required for gelation, i.e., gelation should occur outside said intimate admixture reaction zone, but gel formation should be detected in close proximity to the reactor outlet. Further, the retention time in said reactor should be indeed quite short.

Insofar as reagent sources are concerned, any source capable of providing a liquid phase is suitable, such as aqueous solutions of the aluminate and silicate. In particular, fluosilicic acid or a fluosilicate are advantageously used as the primary source of silica.

It has also now been determined that, in general, the amount of final product obtained depends upon a certain number of factors:

(i) the value of the $H_2O/Na_2O$ ratio;
(ii) the molar ratio $SiO_2/Al_2O_3$;
(iii) the mixing conditions.

These observations are reflected by the curves constituting FIGS. 1 to 4 of the accompanying Figures of Drawing.

Figure 1:
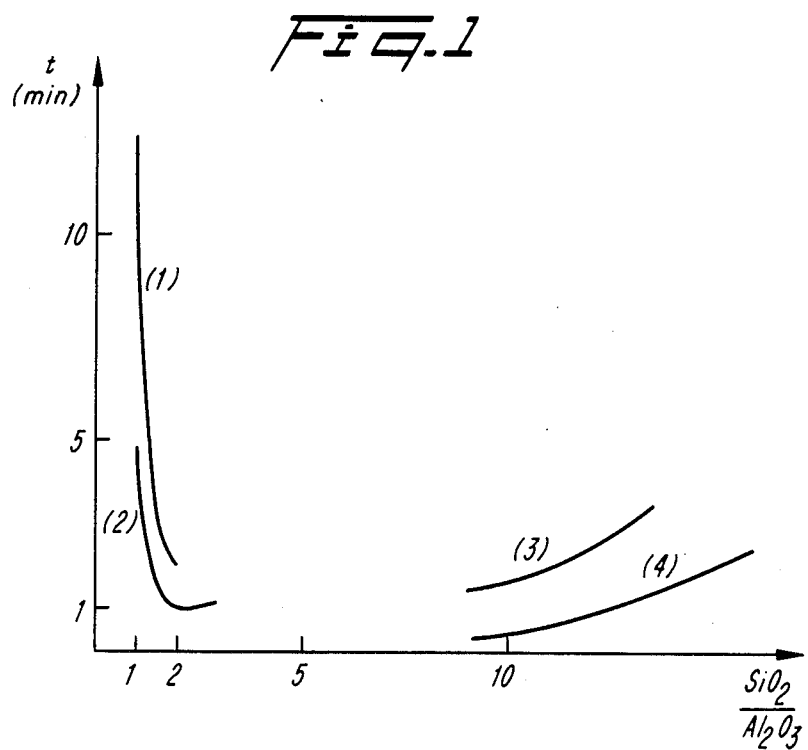
FIG. 1 is a plot of the variation in gelling time as a function of the $SiO_2/Al_2O_3$ ratio for various molar ratios of $H_2O/Na_2O$ at 20° C.

The curve of FIG. 1 is a plot of the variation in gelling time, expressed in minutes, as a function of the $SiO_2/Al_2O_3$ ratio, by taking into account the molar ratio $H_2O/Na_2O$ at 20° C.

Curve (1) corresponds to a molar ratio of $H_2O/Na_2O = 18.6$

Curve (2) corresponds to a molar ratio of $H_2O/Na_2O = 20$

Curve (3) corresponds to a molar ratio of $H_2O/Na_2O = 46$

Curve (4) corresponds to a molar ratio of $H_2O/Na_2O = 75$

It will be appreciated that gelation depends, all other conditions being equal, upon said ratio and the molar ratio $SiO_2/Al_2O_3$.

Figure 2:
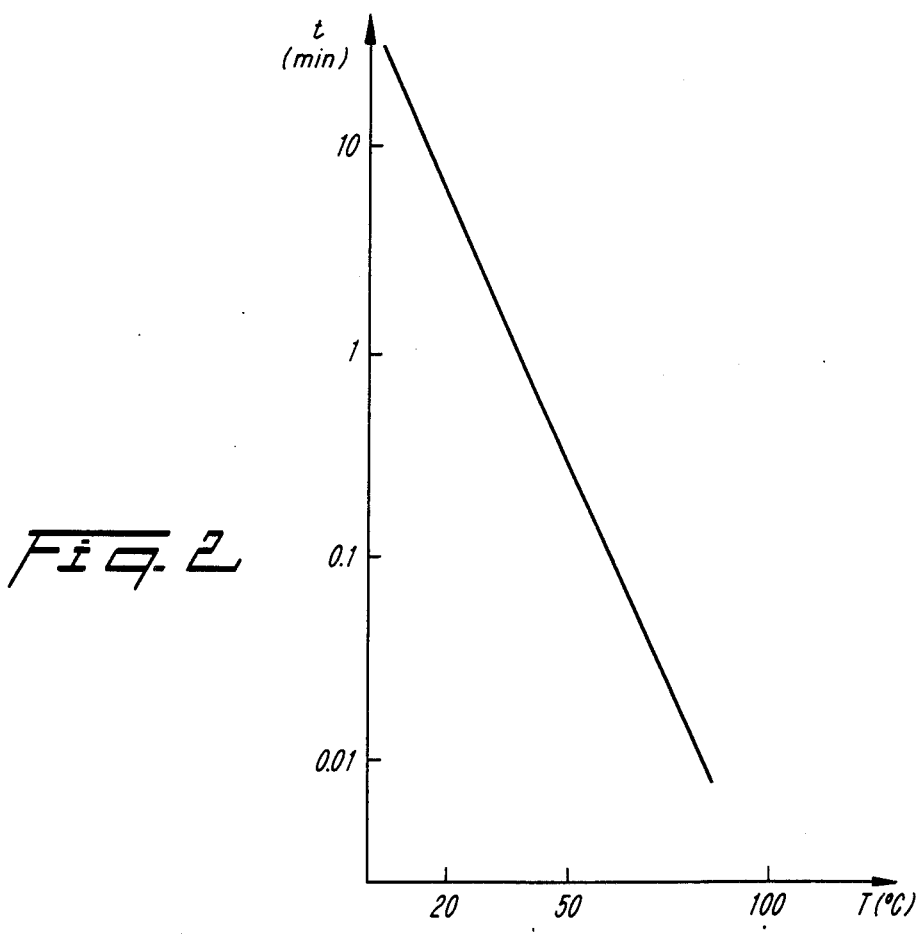
FIG. 2 is a plot of gellation time versus temperature for a specific chemical composition.

The curve of FIG. 2 is a plot of the effect of temperature on gelation time for the following chemical composition:

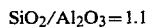

$SiO_2/Al_2O_3 = 1.1$

$H_2O/Na_2O = 18.6$

Figure 3:
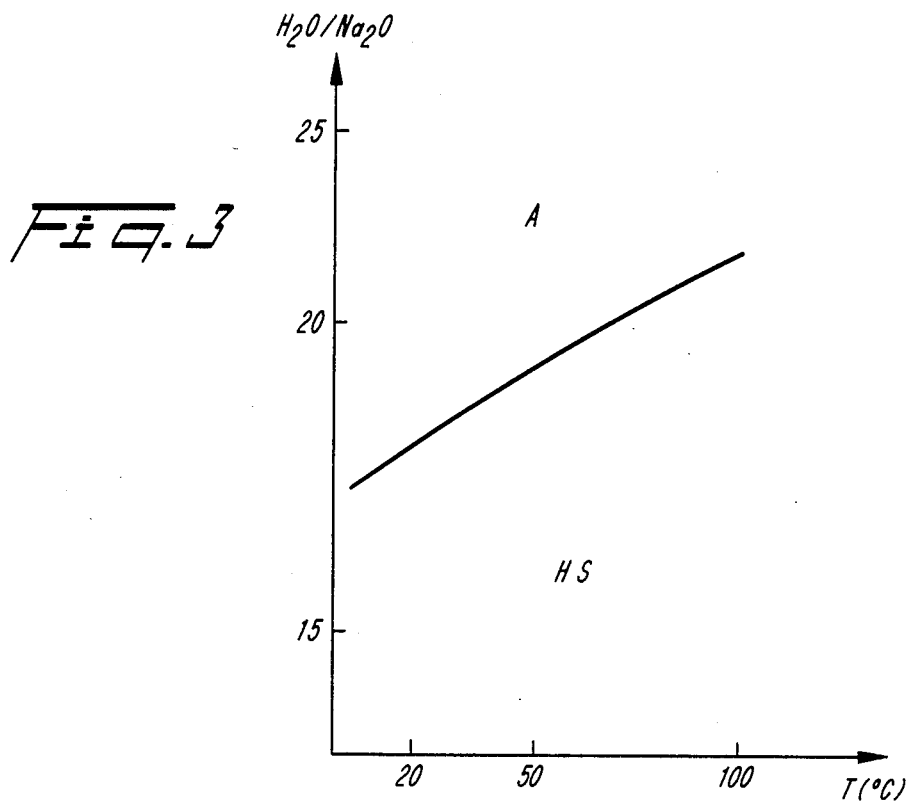
FIG. 3 is a plot of the direction of the variation of the limiting $H_2O/Na_2O$ ratio as a function of temperature.

The curve of FIG. 3 is a plot of the direction of the variation of the limiting molar ratio $H_2O/Na_2O$ as a function of temperature. The limiting $H_2O/Na_2O$ ratio is hereby defined as the ratio below which the formation of hydroxysodalite occurs.

Figure 4:
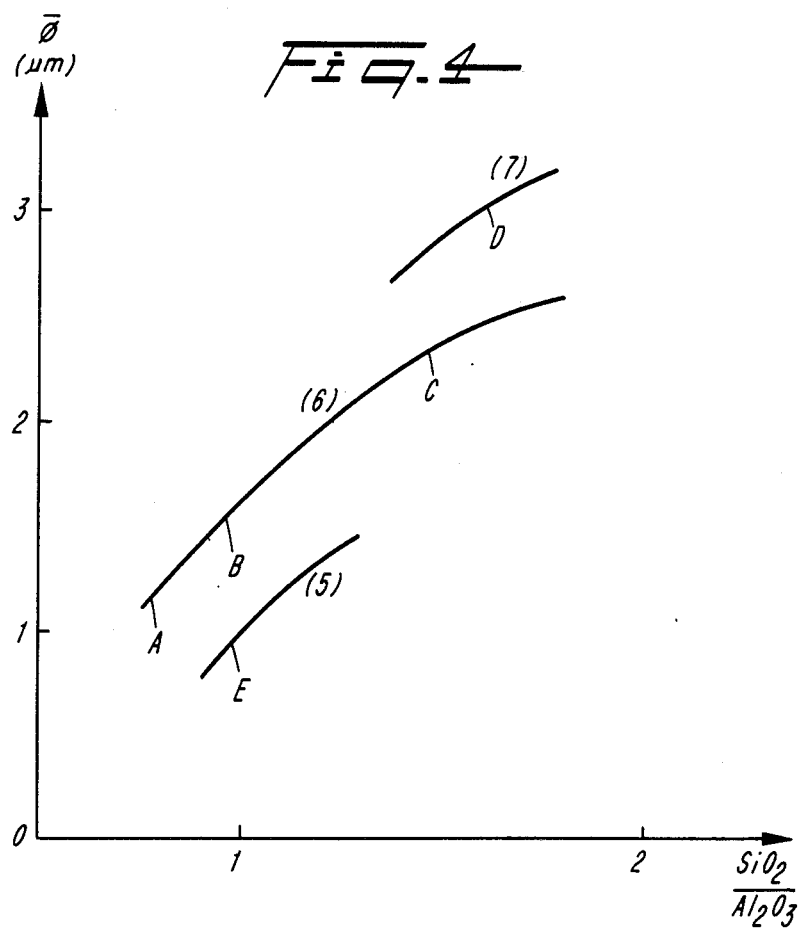
FIG. 4 is a plot of the effect of the $SiO_2/Al_2O_3$, $H_2O/Na_2O$ couple on grain size distribution.

The curve of FIG. 4 is a plot of the effect of the $SiO_2/Al_2O_3$, $H_2O/Na_2O$ couple on the grain size distribution of the curves (5), (6) and (7) corresponding to the molar ratios $H_2O/Na_2O$ respectively equal to 18.6, 21.7 and 23.6.

The grain size distribution is such that, upon overall observation on a Coulter counter, typically employed in this art, it may be considered representative of the secondary structure in relation to the crystallite or primary structure.

It will be seen that under these conditions it is possible to vary the grain size distribution over a rather large range.

These observations lead to the assumption that there exists an overall scheme of optimum conditions for the development of a process for the production of a zeolite of a given grain size distribution.

But, as mentioned above, it is necessary to satisfy these requirements under industrial conditions, which, among others, presupposes feasibility of treatment in large scale installations.

It will be readily understood that a key factor is the contacting and the quality of the micromixture of the reagents. The curves noted hereinbefore particularly demonstrate that a slight difference in the ratios $H_2O/Na_2O$ and $SiO_2/Al_2O_3$ between two points in the medium gives rise to an appreciable difference in grain size distribution.

According to the invention, a good homogeneity of final products may be attained in a very simple manner, and one that is capable of extrapolation to industrial type facilities.

In particular, it has been observed that it is possible to obtain very good results with regard to the final product, even when carrying out the intimate admixture at elevated temperature, by assuring a Reynolds number at least twice the value of the critical Reynolds number for a critical temperature range of from 20° to 90° C., advantageously from 60° to 90° C., with the value of the required Reynolds number increasing with the temperature of the mixture.

It too has been observed that the said value of the required Reynolds number also rises with the diameter of the reactor.

It has been further observed that the value of the required Reynolds number also increases with the flow rate.

The present inventors have now empirically determined that, in the case of a tubular reactor, having a tube diameter less than or equal to 10 mm and/or a flow rate of less than 1 m³/h, the value of the Reynolds number must range from 2 to 5 times the value of the critical Reynolds number.

Beyond this value of 10 mm for the diameter, a higher value of the Reynolds number must be selected for a flow rate of less than 1 m³/h, preferably from 5 to 10 times said value.

It has also unexpectedly been determined that for high flow rates, i.e., generally higher than 1 m³/h, the process of the invention permits a rapid distribution of energy while maintaining short mixing times (less than one second, or even shorter) at elevated temperatures, by varying the Reynolds number. In this case, advantageously high Reynolds numbers are utilized, greater than 50,000 and preferably 100,000 for such flow rates. In this manner, the quality of the product obtained may be maintained: spherical products, with a high velocity constant, small particle size and a narrow grain size distribution of said particles, which is practically impossible with agitated systems in high capacity reactors.

It is thus now feasible, in simple manner, to produce on an industrial scale products that are fully comparable to those that may be obtained in the laboratory.

This is of great practical importance as initially hot solutions may be used, or heat may be transferred to the initial solutions of the reagents prior to gelling, while heretofore it has been necessary to transfer heat either directly to the gel or, preferably, immediately prior to gelling, following the homogenization of the mixture at a low temperature.

According to the invention, the only upper limit on the mixing time is the time necessary for gelation.

The invention, notably, makes it possible to subject the initial reaction medium to the action of a heat transfer fluid, such as superheated steam, so as to effect a transfer of heat to said medium prior to gelling.

The invention in particular permits the obtention of a highly homogeneous gel, without having too high a viscosity, and also permits of good crystallization.

The term "homogeneous gel" as intended herein connotes a gel, the reagent concentration, composition and temperature of which are uniformly the same over each unit volume of the gel.

A "gel without having too high a viscosity" as intended herein connotes a gel that easily flows and which may be agitated without the need for a large shear force.

The process according to this invention in particular enables the synthesis of 4A zeolites of the general formula:

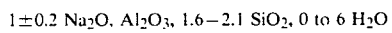
$1 \pm 0.2$ Na$_2$O, Al$_2$O$_3$, 1.6–2.1 SiO$_2$, 0 to 6 H$_2$O from the following beginning reaction medium:

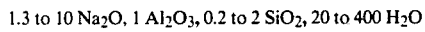
1.3 to 10 Na$_2$O, 1 Al$_2$O$_3$, 0.2 to 2 SiO$_2$, 20 to 400 H$_2$O by the continuous and simultaneous infeed of reagents until a gel is formed, with the beginning reaction medium comprising an excess of sodium hydroxide and alumina.

The process is also applicable for the synthesis of 4A and/or 13 X zeolites having the following general formulae:

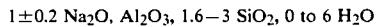
$1 \pm 0.2$ Na$_2$O, Al$_2$O$_3$, 1.6–3 SiO$_2$, 0 to 6 H$_2$O from the following beginning reaction medium:

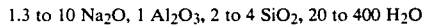
1.3 to 10 Na$_2$O, 1 Al$_2$O$_3$, 2 to 4 SiO$_2$, 20 to 400 H$_2$O by the continuous and simultaneous infeed of reagents until a gel is formed, with the beginning reaction medium comprising an excess of caustic soda and silica.

The temperature advantageously ranges from 20° to 90° C.

The mixing time should be short, e.g., at 90° C. it should be less than 5 sec and preferably less than 1 sec, advantageously less than 0.2 sec, and at 20° C. it should be less than 30 sec.

One advantage of the invention is the ability to select the mixing time. Thus, a period of time of less than 5 sec may be selected at 20° C., which values of time are limiting values estimated from the gelling times.

According to the invention, one skilled in this art may determine (FIG. 4) as a function of the grain size distribution required, the couples or pairs of SiO$_2$/Al$_2$O$_3$—H$_2$O/Na$_2$O. Each of these couples may thus be correlated with the gelling times which are functions of temperature, which then makes it possible to determine the maximum permissible mixing time, from which the minimum value of the Reynolds number may be derived.

In actual practice, as mentioned above, this value for the Reynolds number is higher than the critical Reynolds number and increases with temperature and the initial concentration in silicate.

In a preferred embodiment of the invention, perfectly crystalline 4A zeolites are produced, having mean particle sizes ranging from 0.5 to 5 μm, advantageously 1 and 3 μm, by continuously and simultaneously feeding an aqueous solution of sodium silicate and an aqueous solution of sodium aluminate into a tubular reactor, the composition of the initial reaction medium corresponding to 1.5 to 7 Na$_2$O, Al$_2$O$_3$, 0.5 to 2 SiO$_2$, 25 to 200 H$_2$O, with the mixing time in the tubular reactor being less than the gelling time, the temperature ranging from 20° to 90° C., advantageously from 60° to 90° C., and the Reynolds number being at least equal to twice the critical Reynolds number.

This embodiment makes it possible to prepare zeolites of a small grain size, the grain size distribution being very narrow in a process wherein there is a deficit of silicate with respect to the aluminate.

According to this embodiment, the preparation of the aluminate may be integrated into the process. With all of the reagents being hot, an appreciable savings in energy is realized. Furthermore, it is not necessary to reheat the gel, which represents a considerable advantage.

According to another embodiment of the invention, the operation is carried out under the same conditions, except that the silicate is present in excess (SiO$_2$/Al$_2$O$_3$ ratio greater than 2). A strong decrease in grain size is observed, as shown in FIG. 4.

According to still another embodiment of the invention, the process is carried out with such ratio of SiO$_2$/Al$_2$O$_3$ being about 2. In this case, the present inventors have also determined that for the same molar ratio of H$_2$O/Na$_2$O the grain size is larger.

The process according to the invention thus provides a very high degree of flexibility while utilizing very simple means. Unexpectedly and surprisingly, it is possible to obtain, in the hot state, a gel that is homogeneous with respect to the reagents, the concentrations and the temperature thereof, and it is, moreover, easy to crystallize.

The process of the invention may be carried out in a reactor simply comprising a cylindrical or like tube, into which the reagents are introduced. It will be appreciated, however, that these simple means are not limitations upon the invention.

The gel which results is recovered continuously and under moderate agitation.

It may be subjected to any downstream operation, such as aging and crystallization.

The present invention also relates to the final products obtained consistent herewith.

These products have notably enhanced properties, in particular in regard to the velocity constant with respect to the surface of the zeolite per liter of solution, which is higher than 0.15, preferably higher than 0.25 and advantageously ranges from 0.4 and 4 s$^{-1}$ liter meter$^{-2}$ (s$^{-1}$ 1 m$^{-2}$), hereinafter designated as ks.

Furthermore, such zeolites have:

(i) a mean diameter of primary particles ranging from 0.1 to 10 μm and advantageously from 0.5 to 5 μm; and (ii) a theoretical cation exchange capability greater than 100 mg of CaCO$_3$/g of anhydrous product, and preferably greater than 200 mg.

These properties render the zeolite especially suitable for use as an auxiliary detergent material (detergent builder), as a detergent substitute, individually or in combination with other auxiliary detergents, such as tripolyphosphate, NTA, the carbonates, and the like.

In particular, the zeolites obtained via the process of the invention exhibit remarkable properties when they are used in a detergent composition comprising a tripolyphosphate, as per French Application No. 82/13,065 of July 27, 1982, which features a process to obtain a tripolyphosphate which is very rapidly hydrated, and according to which:

(a) a mono- or disodium orthophosphate solution having a total molar ratio Na/P of from 1.64 to 1.70, is first prepared;

(b) a vortex or helical flow of a hot gaseous phase characterized by large volume of movement is established;

(c) the orthophosphate solution prepared as in (a) is introduced into a zone of depression within said vortex flow in a manner such that dispersion and heat treatment of said orthophosphate solution is effected by said gaseous phase, in order to prepare the tripolyphosphate therefrom; and (d) the product resulting from the step (c) is subjected to an additional heat treatment.

The apparatus further comprises outlet means 8.

The curve of FIG. 5 shows the variation of the minimum Reynolds number as a function of temperature for a medium corresponding to the following conditions (Example 1):

(i) $SiO_2/Al_2O_3 = 0.8$ $H_2O/Na_2O - 21.7$;

(ii) 4A zeolite concentration equal to 120 g/l; and (iii) diameter of the tubular reactor equal to or less than 10 mm.

EXAMPLE 1

This example illustrates how grain size may be varied by simply varying the chemical composition of the system and/or the operating conditions.

The aqueous solutions of sodium aluminate 1 and sodium silicate 2, which either may or may not have been preheated were simultaneously introduced into the smooth-walled tubular reactor 3.

Heating was carried out via heat transfer liquid circulating within the double envelope 6 of the vat 5 and enabled heating of the mixture to the crystallization temperature (85° C.) and maintaining same at this temperature throughout the crystallization period, which lasted for 2 hours.

Chemical compositions and corresponding grain sizes obtained are reported in the Table Ia which follows:

TABLE Ia

| Experiment No. | Aluminate (mole) | | | Mixture (mole) | | | Silicate (mole) | | | | $\phi$ ($\mu$m) |
|---|---|---|---|---|---|---|---|---|---|---|---|
| | $Na_2O$ | $Al_2O_3$ | $H_2O$ | $Na_2O$ | $SiO_2$ | $H_2O$ | $Na_2O_3$ | $Al_2O_3$ | $SiO_2$ | $H_2O$ | |
| 1 | 2 | 1 | 40 | 1 | 2 | 30 | 6 | 2.5 | 2 | 130 | 1.2 |
| 2 | 2.5 | 1 | 50 | 1 | 2 | 30 | 6 | 2 | 2 | 130 | 1.6 |
| 3 | 3.57 | 1 | 71.4 | 1 | 2 | 30 | 6 | 1.4 | 2 | 130 | 2.3 |
| 4 | 3.6 | 1 | 80 | 1 | 2 | 30 | 5.5 | 1.25 | 2 | 130 | 3.0 |
| 5 | 1.61 | 1 | 19.4 | 0.6 | 2 | 30 | 3.5 | 1.8 | 2 | 65 | 1.2 |

In order to further illustrate the present invention and the advantages thereof, the following specific examples are given, it being understood that same are intended only as illustrative and in nowise limitative.

In FIG. 6 of the accompanying Figures of Drawing is schematically/diagrammatically shown suitable apparatus for carrying out the process according to the invention.

An aqueous solution of sodium aluminate is introduced through inlet line 1 and an aqueous solution of sodium silicate through inlet line 2 into a tubular reactor 3 defined by a smooth-walled tube opening above a vat or vessel 5, provided with an agitator 7. The vat is maintained at appropriate temperature by means of a heat transfer fluid circulating within double jacketed envelope 6.

The apparatus may further comprise a vapor ejector 4 located at the outlet of the tubular reactor 3.

In FIG. 4, the functional points A, B, C, D and E corresponding to Experiments 1, 2, 3, 4 and 5 were plotted such as to indicate the relationship between the ratio pairs, $SiO_2/Al_2O_3$ and $H_2O/Na_2O$, and the grain size (granulometry).

In Table Ib are reported the results obtained by varying the operating conditions for each experiment, while preserving the final grain size distribution.

The following observations were made:

(i) the temperature of the mixture may be varied over a wide range by altering the Reynolds number and thus the geometry of the mixing apparatus;

(ii) the results were obtained using an amount of mixture on the order of 200 liters, i.e., on a scale that may be extrapolated to industrial levels;

(iii) velocities could be varied over a wide range; and (iv) gelling times were very short, as can be seen from FIG. 2 which corresponds to Experiment 5.

TABLE Ib

| Experiment No. | T(°C.) mixture | Smooth-walled tube | | Mixture | | Feed time into smooth-walled tubular reactor (min) | $\phi$ ($\mu$m) | Volume crystallized (l) |
|---|---|---|---|---|---|---|---|---|
| | | $\phi$ (mm) | L (mm) | Flow rate (l/h) | Re | | | |
| 1-a | 80 | 8 | 40 | 372 | 12,800 | 35 | 1.2 | 217 |
| 1-b | 70 | 10 | 130 | 445 | 9,200 | 30 | 1.2 | 222 |
| 1-c | 35 | 10 | 130 | 240 | 1,900 | 45 | 1.2 | 180 |
| 1-d | 35 | 10 | 250 | 475 | 3,700 | 30 | 1.2 | 238 |
| 1-e | 85 | 10 | 250 | 430 | 12,700 | 30 | 1.2 | 215 |
| 1-f | 85 | 8 | 40 | 475 | 15,800 | 30 | 1.2 | 238 |
| 2-a | 85 | 10 | 250 | 430 | 12,700 | 30 | 1.6 | 215 |
| 2-b | 80 | 8 | 40 | 470 | 14,700 | 30 | 1.6 | 235 |

TABLE 1b-continued

| Experiment No. | T(°C.) mixture | Smooth-walled tube ⌽ (mm) | Smooth-walled tube L (mm) | Mixture Flow rate (l/h) | Re | Feed time into smooth-walled tubular reactor (min) | ⌽ (μm) | Volume crystallized (1) |
|---|---|---|---|---|---|---|---|---|
| 3-a | 85 | 16 | 200 | 240 | 6,200 | 60 | 2.3 | 240 |
| 3-b | 80 | 8 | 100 | 250 | 10,200 | 45 | 2.3 | 188 |
| 3-c | 20 | 8 | 100 | 250 | 2,500 | 60 | 2.3 | 250 |
| 4-a | 20 | 8 | 40 | 145 | 2,000 | 90 | 3.0 | 217 |
| 4-b | 85 | 8 | 40 | 370 | 15,000 | 30 | 3.0 | 185 |
| 5-a | 20 | 10 | 250 | 240 | 940 | 60 | 1.2 | 240 |
| 5-b | 35 | 10 | 250 | 240 | 1,900 | 90 | 1.2 | 210 |
| 5-c | 60 | 10 | 250 | 240 | 3,400 | 60 | 1.2 | 240 |
| 5-d | 85 | 8 | 40 | 720 | 16,000 | 20 | 1.2 | 240 |

EXAMPLE 2

This example was identical to that of Experiment 5-a, except that the transfer of heat was effected by means of a vapor ejector 4 located at the outlet of the tubular reactor 3. It yielded a product identical to that of Experiment 5-a of Example 1.

EXAMPLE 3

In this example, Experiment 5-a of Example 1 was repeated, but the tubular reactor 3 was replaced by a static mixer having a diameter of 4.9 mm and a length of 135 mm. The product obtained was identical to that obtained in said Experiment 5-a.

If the same replacement was made in Experiment 5-c, plugging of the static mixer was observed after 5 minutes of operation.

EXAMPLE 4

This example illustrates the properties of product of the invention, according to the table:

|  | 5a | 4a | 1e | Control |
|---|---|---|---|---|
| ks | 0.8 | 0.70 | 0.7 | 0.14 |

The control consisted of a cubic structure type 4A zeolite, having an exchange capacity, measured in mg $CaCO_3$/g of the anhydride, equal to 226±10. The exchange capacity was determined after 15 min, in a NaCl 3 g/l medium, by means of an electrode specific to calcium (ORION - 93 - 20).

The initial concentration in calcium was $5-10^{-3}$ mole $1^{-1}$ and the zeolite concentration was 1 g (anhydride)/1. The temperature was 25° C.

ks represents the velocity constant with respect to the surface of the zeolite per liter of solution, expressed in $s^{-1}$ 1 $m^{-2}$.

The latter was determined from the initial exchange velocity which is expressed by:

$$V = -\frac{d(Ca^{2+})}{dt} = k \, (Ca^{2+}) \, (\text{zeolites}) = k_s (Ca^{2+}) \, S$$

with:
(zeolite): zeolite concentration expressed in ppm of the anhydrous zeolite;
k : second order velocity constant, expressed in $s^{-1}$ $ppm^{-1}$;

S : surface of zeolite used per liter of solution, measured with a scanning microscope, expressed in $m^2$ $1^{-1}$ $k_s$ : velocity constant with respect to the zeolite surface, per liter of solution, expressed in $s^{-1}$ 1 $m^{-2}$ The initial exchange velocity of calcium by a zeolite is measured by means of a "forced circulation cell" (A. M. Gary, E. Piemont, M. Roynette and J. P. Schwing, *Anal. Chem.*, 44, 198 (1972); A. M. Gary, Thesis, Third Cycle Strasbourg (1970)). This device makes it possible to obtain a mixing time sufficiently short such as not to disturb the measurement of the kinetics of exchange. The variation in the calcium concentration over time is thus observed after a very rapid mixture of the reagents, durin the exchange reaction, by spectrophotometry in a heterogeneous medium and using a calcium indicator: murexide (wave length 495 nm).

In order to demonstrate additional advantages, in detergency, of the zeolites obtained by the process of the invention, an incrustation test was carried out, as described in published French Application No. 82/10,638, filed June 18, 1982.

To compare the incrustation performance of a control zeolite with a zeolite according to the invention, having the same grain size distribution, a series of washings was carried out using a detergent formulation comprising a mixed TPP-zeolite detergent builder, having the following composition:

| (1) Linear sodium dodecylbenzene sulfonate | 7.5% |
|---|---|
| (2) Sodium stearate | 3% |
| (3) Linear $C_{18}$ ethoxy alcohol, comprising 12 moles ethylene oxide | 3% |
| (4) Linear $C_{18}$ ethoxy alcohol, comprising 50 moles of ethylene oxide | 2% |
| (5) Anhydrous sodium tripolyphosphate | 13.75% |
| (6) Zeolite | 13.75% |
| (7) Sodium pyrophosphate | 2% |
| (8) Trisodium pyrophosphate | 0.5% |
| (9) Sodium silicate, 20% water | 8.6% |
| (10) Sodium sulfate | 17.5% |
| (11) Carboxymethylcellulose | 1.5% |
| (12) Optical brighteners | 0.4% |
| (13) Enzymes | 0.3% |
| (14) Perborate 3 $H_2O$ | 25% |
| (15) Magnesium silicate | 1% |
| (16) Na EDTA | 0.2% |

Cumulative wash cycles were effected at 60° C. in a tergotometer. The concentration of the detergent was 6 g/l and the hardness of the water was 32° H.T. (NFT 90 003); the molar ratio $[Ca^{++}]/]^{++}]$ was about 5. Each cycle comprised a 20 min wash cycle and 3 hard water rinses. Each vessel of the tergotometer contained twelve pieces of cotton (reference 405 Testfabric, dimensions 10×12 cm). The amount of solution used for each wash and for each rinse was 1 liter per vessel. Incrustation was evaluated after 30 cumulative washes by measuring the amount of ash.

The following values were determined:

|  | Amount of ash |
|---|---|
| Control | 8.5 |
| Experiment 4a | 7.1 |

The proportion of zeolite in the ash was determined as:

| Control | 4.2% with respect to the amount of ash |
|---|---|
| Experiment 4a | 2.8 with respect to the amount of ash |

EXAMPLE 5

This sample illustrates the improvement attributed to a TPP according to the invention, in combination with a 4A zeolite as a detergent co-builder, in the presence of a nonionic surfactant.

Several polyphosphates and zeolites were used in this example.

Operating conditions were as follows:

| (1) TPP (prehydrated 1.5%) | 25 g calculated as the anhydride |
|---|---|
| (2) Zeolite | 25 g calculated as the anhydride |
| (3) Sodium sulfate | 17 g calculated as the anhydride |
| (4) Nonionic surfactant (C = 17, EO = 25) | 1.7 g calculated as the anhydride |
| (5) Water | 100 g calculated as the anhydride |

The medium was heated to 70° for 30 min; the liquor was then atomized at different temperatures corresponding, with respect to the TPP obtained, either to simple drying (TPP.6 H₂O) or to superdrying corresponding to 4 moles of residual water per mole of the beginning TPP.

The materials employed were:
(i) Zeolite:
  (a) corresponding to Experiment 5a;
  (b) control: commercial cubic type 4A, having a particle diameter of 3 μm.
(ii) Sodium tripolyphosphate:
  (a) commercial type phase I and II;
  (b) tripolyphosphate obtained as described in published French Application No. 82/13,065, i.e., in the following manner:

The apparatus used was that schematically/diagrammatically shown in FIG. 7.

Same comprised a dispersing head 8, a receiving double cone 9 and a cyclone 10. The head itself comprised a perforated basket 11 defining an annular space 12, into which a tangential inlet 13 opens. This annular space enabled establishment of a symmetrical, helical vortex flow by means of orifices such as 14 and at the neck 15. The phase (solution) to be treated was introduced through an axial inlet conduit 16 and directed into a zone of depression within the vortex, i.e., the upstream end of the double cone 9.

The treating gases were introduced hot into the annular space 12.

The TPP's were obtained from an industrial grade orthophosphate solution (acid resulting from the digestion of minerals using $H_2SO_4$, neutralized with NaOH or $Na_2CO_3$ to a ratio of $Na_2O/P_2O_5 = 1.66$, and filtered).

(1) Production of TTP (according to published French Application No. 82/13,065)

A solution containing 19.6% $P_2O_5$, 14.2% $Na_2O$ (Na/P=1.66) and the following impurities ($Na_2SO_4$:2.8%; NaF:0.2%; $SiO_2$ 0.14%; NaCl:0.3%; Ca:400 ppm; Mg:400 ppm; sum of metallic impurities: 1,000 ppm) was atomized in the aforedescribed apparatus by means of a stream of hot air, heated to 930° C. and having a flow rate of 50 $Nm^3/h$. The flow rate of the solution was adjusted to give an outlet temperature of both gases and product of 450° C.

The product obtained was subjected to additional heating in a tubular furnace at 500° C. for 10 min.

(2) Prehydration of TPP

The TPP's employed in the examples were prehydrated in identical manner via water atomization, such that the loss at 350° C. was approximately 1.5%.

The tripolyphosphate obtained corresponded to a proportion of Phase I $$= \frac{\text{Phase I}}{\text{Phase I + Phase II}} \times 100$$

measured by Raman spectroscopy, 87%, but displayed a characteristic behavior; it shall hereinafter be designated STPP, per said published French Application No. 82/13,065.

The results are reported in the following Table II:

TABLE II

| Hydrolysis proportion | Zeolite of Exp. 5-a | | Control zeolite | |
|---|---|---|---|---|
|  | Drying | Superdrying | Drying | Superdrying |
| STPP Phase II | 10 | 10 | 10 | 10 |
| STPP Phase I | 15 | 34 | 18 | 69 |
| STPP* control, 87% Phase I | 13 | 31 | 16 | 61 |
| STPP of French Application No. 82/13,065 | 12 | 17 | 12 | 35 |

*obtained by furnace calcination at 520° C. of a commercial STPP having 31% of Phase I.

It will be seen that:
(i) for Phase II, there was an appreciable improvement upon superdrying.

It too will be appreciated that this form of TPP is the one most commonly used in detergents at the present time. This improvement provides a greater latitude concerning the conduct of the drying temperature and thus a greater flexibility of the control of the various process parameters during atomization.

(ii) as the production of detergents is currently tending towards the substitution of a portion of Phase II by Phase I in view of the higher speed of hydration of the latter, the results of Table II evidence that the products according to the invention provide a characteristic improvement upon drying and a notably large improvement upon superdrying.

It is also known, however, that one of the disadvantages of Phase I is the increase in viscosity it imparts to the solution in a nonionic surfactant medium, which limits its utilization. A comparison with STPP Phase I (87%) according to published French Application No. 82/13,065 evidences that the product according to the invention behaves identically upon drying, but provides a marked improvement upon superdrying.

In conclusion:

(1) the process according to the invention provides products which are at least equivalent to the existing products upon drying and are much more effective upon superdrying.

(2) in view of the fact that the presence of zeolite as a detergent co-builder gives rise to an increase in the rate of TPP hydrolysis, it will be noted that the process according to the invention provides products which make it possible to reduce such increase in the rate of hydrolysis. With an identical degree of hydrolysis, therefore, a larger amount of TPP, Phase II, can be replaced by TPP, Phase I, and particularly by a TPP according to French Application No. 82/13,065, which makes it possible to improve the kinetics and the rate of hydration of anhydrous TPP in the presence of zeolites.

Examples 6 and 7 demonstrate the advantages of the invention upon extrapolation to an industrial scale.

EXAMPLE 6

In this example, the conditions respecting the chemical medium were the same as in Example 1, but at an industrial scale.

The flow rate of the mixture was 1.5 m³/h for 1 hour in a stainless steel tube having a diameter of 16 mm and a length of 170 mm.

The Reynolds number employed was 25,700, for a temperature of 85° C.

The mixture exited the tubular reactor in the liquid state and gelled within a few centimeters upon leaving the reactor outlet.

The product obtained after crystallization was identical to that of Example 1.

EXAMPLE 7

The conditions and procedure of Example 6 were repeated, but a flow rate of 15 m³/h and a tubular reactor having a diameter of 20 mm and a length of 450 mm were used, while employing a Reynolds number of 203,000. The retention time was 0.034 sec.

The mixture exited the reactor in the liquid state and gelled in close proximity to the outlet thereof.

The final product was again always identical.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of a zeolite of types 4A and/or 13X comprising simultaneously and continuously introducing as a fluid stream both an aqueous solution of sodium silicate and an aqueous solution of sodium aluminate into a tubular reactor to effect the continuous intimate admixture thereof, continuously transferring said intimate admixture from said tubular reactor to a zone of gelation to effect the continuous homogeneous gelling thereof, said intimate admixture being carried out at a Reynolds number of at least twice the value of the critical Reynolds number of the fluid stream, the time of retention of said intimate admixture in said tubular reactor being less than that period of time required for the gelation thereof, and thence effecting crystallization of a zeolite from said homogeneous gel.

2. The process as defined in claim 1, said tubular reactor comprising a uiform, smooth-walled tubular reactor.

3. The process as defined by claim 1, said tubular reactor comprising a Venturi mixer.

4. The process as defined by claim 1, said intimate admixture being carried out at a temperature ranging from 20° to 90° C. wherein the Reynolds number progressively increases as a function of the temperature of said intimate admixture.

5. The process as defined by claim 2, said tubular reactor having a diameter less than or equal to 10 mm, and said intimate admixture being carried out at a Reynolds number of from 2 to 5 times greater than the critical Reynolds number.

6. The process as defined by claim 2, said tubular reactor having a diameter in excess of 10 mm, the reagent flow rate being less than 1 m³/h, and said intimate admixture being carried out at a Reynolds number of from 5 to 10 times greater than the critical Reynolds number.

7. The process as defined by claim 2, said tubular reactor having a diameter of at least 10 mm, the reagent flow rate being greater than 1 m³/h, and said intimate admixture being carried out at a Reynolds number of at least 50,000.

8. The process as defined by claim 7, said Reynolds number being at least 100,000.

9. The process as defined by claim 1, further comprising heating said intimate admixture prior to the gelation thereof.

10. The process as defined by claim 1, said homogeneous gel being maintained at a temperature of at least the crystallization temperature thereof.

11. The process as defined by claim 1 for the preparation of a zeolite of type 4A having the general formula 1±0.2 Na$_2$O, Al$_2$O$_3$, 1.6 to 2.1 SiO$_2$, 0 to 6 H$_2$O, the initial composition of the intimate admixture comprising 1.3 to 10 Na$_2$O, 1 Al$_2$O$_3$, 0.2 to 2 SiO$_2$, 20 to 400 H$_2$O, and said initial composition comprising an excess of sodium hydroxide and alumina.

12. The process as defined by claim 1 for the preparation of a zeolite of types 4A and/or 13X having the general formula 1±0.2 Na$_2$O, Al$_2$O$_3$, 1.6 to 3 SiO$_2$, 0 to 6 H$_2$O, the initial composition of the intimate admixture comprising 1.3 to 10 Na$_2$O, 1 Al$_2$O$_3$, 2 to 4 SiO$_2$, 20 to 400 H$_2$O, and said initial composition comprising an excess of sodium hydroxide and silica.

13. The process as defined by claim 2 for the preparation of a zeolite of type 4A having a mean grain size ranging from 0.5 to 5 μm, the initial composition of the intimate admixture comprising 1.5 to 7 Na$_2$O, Al$_2$O$_3$, 0.5 to 2 SiO$_2$, 25 to 200 H$_2$O, said intimate admixture having a temperature ranging from 20° to 90° C. and the time of retention thereof in said first reaction zone being less than about 30 seconds, and said intimate admixture being carried out at a Reynolds number of at least twice the value of the critical Reynolds number.

14. The process as defined by claim 1, said gelation and crystallization being carried out under agitation.

* * * * *